Nov. 8, 1966  A. K. WATT  3,283,842
FRONT WHEEL DRIVE TORQUE STEER COMPENSATOR
Filed Dec. 8, 1964  2 Sheets-Sheet 1

INVENTOR.
Andrew K. Watt
BY
W. F. Wagner
ATTORNEY

INVENTOR.
Andrew K. Watt
BY
W. J. Wagner
ATTORNEY

United States Patent Office 3,283,842
Patented Nov. 8, 1966

3,283,842
FRONT WHEEL DRIVE TORQUE
STEER COMPENSATOR
Andrew K. Watt, Lansing, Mich., assignor to General Motors Corporation, Detroit, Mich., a corporation of Delaware
Filed Dec. 8, 1964, Ser. No. 416,820
3 Claims. (Cl. 180—48)

This invention relates to front wheel drive vehicles and more particularly to a front wheel drive arrangement which permits the front wheels to negotiate a turn without exhibiting understeer or oversteer characteristics.

It is well known that front wheel drive automobiles exhibit instantaneous understeer and oversteer characteristics with an increase and decrease in driving torque, respectively. In other words, in the absence of normal driver control of the steering wheel, while the vehicle is driven and the front wheels are positioned for a turn about a definite turning radius, the turning radius is effectively increased with an increase in driving torque applied to the front wheels. Similarly, if the driving torque is decreased when negotiating such a turn, the turning radius is effectively decreased.

Accordingly, a principal object of this invention is to provide a front-wheel drive torque steer mechanism which compensates for the above-described steering characteristics.

Another object of this invention is to provide a front-wheel drive steering mechanism which includes means for automatically applying a steering force to the steerable wheels whenever there is an increase or decrease in driving torque and the wheels are in a turned position.

The above objects and others are accomplished in accordance with the invention by a front-wheel drive arrangement which includes a wheel supported for steerable movement about a substantially vertical steering axis. Drive is transmitted to the wheel through a differential drive mechanism, which in turn receives drive from a transmission and engine suitably supported by the frame. A half axle is located between the wheel and differential and has one end connected to the latter by a helical splined joint so that axial movement of the axle along its longitudinal axis can be realized in certain positions of the wheel about the steering axis. In addition, a universal joint is provided between the other end of the half axle and the wheel at a point inboard from the steering axis, with the result that when the wheels are positioned for a turn, the latter-mentioned universal joint is displaced along an arc having its center point at the steering axis.

A more complete understanding of the invention can be derived from the following detailed description taken in conjunction with the drawings in which.

Figure 1:
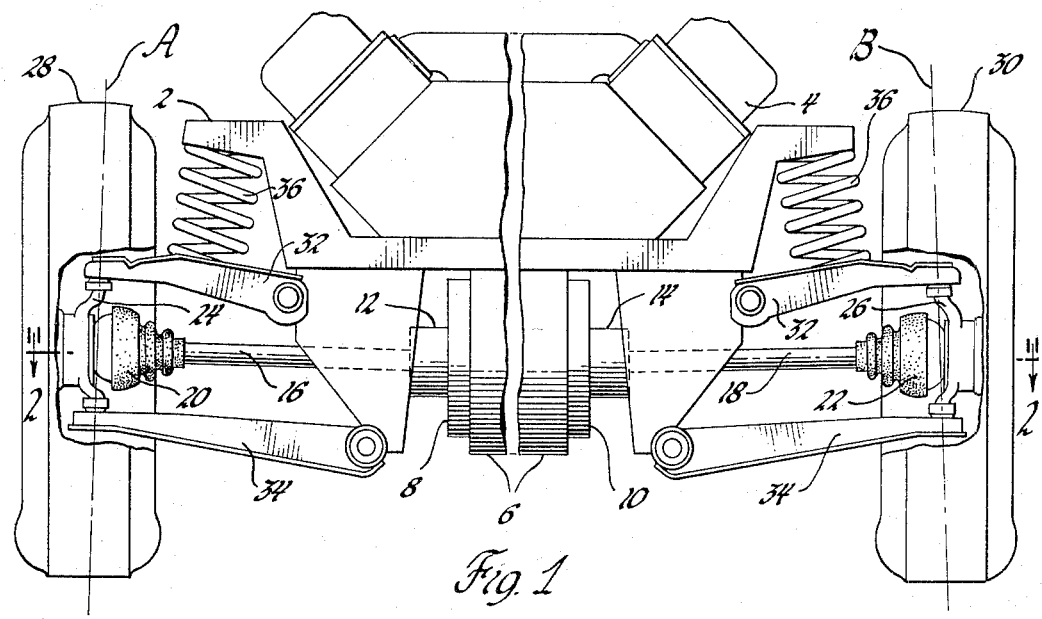
FIGURE 1 is a fragmentary elevational view of a vehicle front end incorporating a drive arrangement made in accordance with the invention.

Now referring to FIGURE 1, a portion of a vehicle is illustrated comprising a frame 2, supporting an engine 4 that is connected through the usual transmission, not shown, to a differential drive mechanism 6 suspended from the frame. At the lateral opposite sides of the differential mechanism 6, inboard brake mechanisms 8 and 10 are provided. Outboard of each brake mechanism are "pot"-type universal joint assemblies 12 and 14 which are operatively connected to live half axles 16 and 18. At their extreme outboard ends the half axles 16 and 18 are respectively connected to "Rzeppa" type universal joints 20 and 22 which, in turn, are connected with steering knuckles 24 and 26. As conventional, the steering knuckles support the driving wheels 28 and 30 for steering movement about substantially vertical axes A and B by having the extreme vertical ends thereof mounted in the outer portions of wish-bone shaped upper and lower control arms 32 and 34. The inner end of each control arm is pivotally connected to the frame for movement about a horizontal axis, and a coil spring 36 is interposed between each upper control arm and the frame for providing the usual resilient support for the associated wheel.

Figure 2:
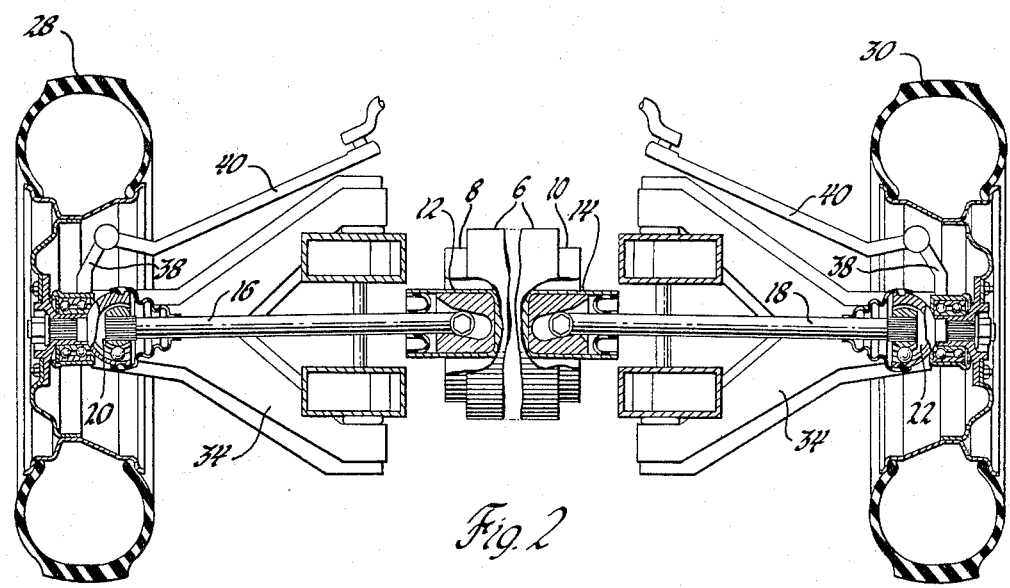
FIGURE 2 is a view taken on lines 2—2 of FIGURE 1.

As seen in FIGURE 2, the usual knuckle arm 38 is fixed to each of the steering knuckles and pivotally connected with a tie rod 40 which, in turn, is connected with the usual steering linkage leading to the steering wheel. Thus, when the steering wheel is turned by the driver, for example, for a right-hand turn the tie rods work in unison for positioning the wheels 28 and 30 to the positions shown in FIGURE 3. It will be observed that when the wheels are located in such positions, the outboard end of each of the half axles 16 and 18 is moved to one side of transverse axis C passing through the steering axis of each of the wheels. This occurs due to the fact that the universal joints 20 and 22 are positioned inboard of the steering axis, as aforedescribed. This arrangement, in combination with the "pot"-type universal joint assemblies 12 and 14 is significant because it serves to compensate for any adverse understeer and oversteer characteristics normally encountered with a front-wheel drive vehicle.

Figure 3:
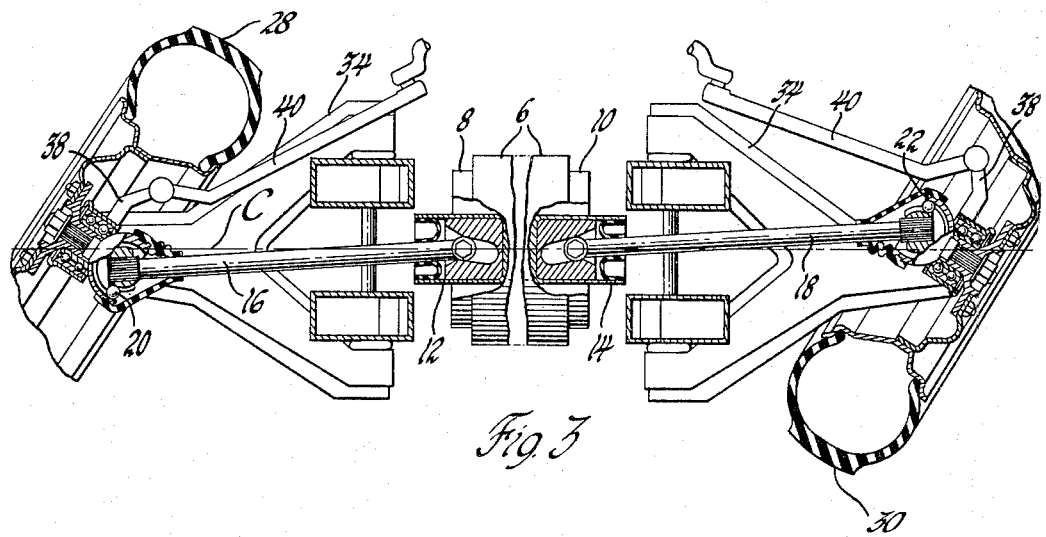
FIGURE 3 is similar to FIGURE 2 but shows the relative positions of the driving components when the wheels are turned.

At this juncture, it should be noted that each of the "pot"-type universal joint assemblies are of the axial sliding type shown and described in detail in United States Patent No. 2,898,750, entitled "Universal Joint," in the name of John Z. De Lorean, and assigned to the assignee of this invention. Hence, reference is made to that patent for a complete understanding of the "pot" assemblies; however, for present purposes it should suffice to mention that each of the assemblies 12 and 14 is of the type which driving torque tends to extend the length of the live axle while braking torque tends to reduce the length of the driving axle. In order to better understand the working of the "pot" assemblies with this invention reference is now made to FIGURES 4 and 5, which schematically illustrate the wheel arrangements and components thereof as shown in FIGURES 2 and 3, respectively.

Figure 4:
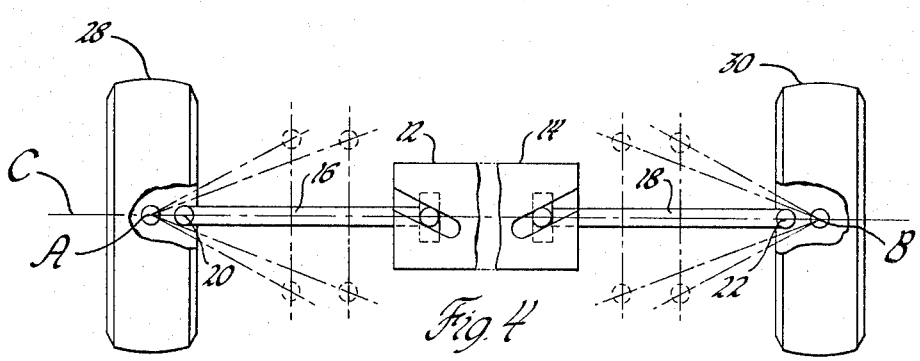
FIGURE 4 is a schematic diagram depicting the arrangement of FIGURE 2.
Figure 5:
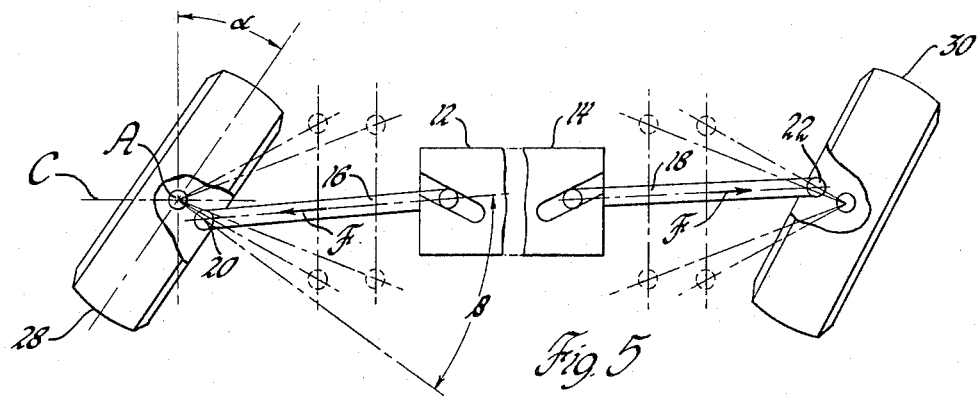
FIGURE 5 is a schematic diagram depicting the arrangement of FIGURE 3.

FIGURE 4 shows the front wheels located in a straight-ahead position wherein the steering axes A and B, "pot" assemblies 12 and 14, universal joints 20 and 22, and the half axles 16 and 18 are positioned in direct alignment along the transverse axis C. In this position, any increase or decrease in driving torque acts directly on the steering knuckle at the steering axes A and B and, accordingly, has no effect on the position of the wheels. On the other hand, when the wheels 28 and 30 are turned, as shown in FIGURE 5, and assuming driving torque is being applied to the front wheels, understeer occurs which effectively increases the turning radius of the front wheels. However, due to the axial force-applying arrangement provided by the "pot"-type universal joint assemblies 12 and 14, a force F acts along the axis of each half axle 16 and 18 in the direction of the arrows to produce clockwise torques that serve to effectively decrease the turning radius of the wheels. The compensating clockwise torque is realized by having the universal joints 20 and 22 located in positions inboard of the steering axes A and B so that they can assume the offset positions shown with respect to the axis C when the wheels are turned and thereby establish a moment arm between the associated steer axis and the longitudinal axis of the half axle. In further explanation of the above, it will be noted that as seen in FIGURE 5, the front drive wheel 28 is inclined at angle $\alpha$ to the longitudinal center axis of the vehicle so as to produce an angle $\beta$ between the longitudinal axis of the wheel spindle connected with steering knuckle 24 and the longitudinal axis of the half axle 16. Thus, when driving torque is being transmitted through the half axle 16, the "pot"-type universal assembly 12 produces an axially outward thrust with the force F which acts against the outer universal joint 20. This results in a clockwise torque about the steering axis A which tends to turn the wheel 28 clockwise and increase the steering angle $\alpha$. This clockwise torque is equal to $FxLx$ sine $\beta$ where L is equal to the distance between the steering axis A and the center of the universal joint 20.

As seen in FIGURE 5, deceleration, which is caused either by engine braking or by the brakes 8 and 10, will cause the effective turning radius of the wheels 28 to decrease. This, however, is resisted by a counterclockwise torque produced by an axial force, such as F, which acts in a direction toward the "pot" assemblies. In other words, the braking torque causes the "pot" assemblies 12 and 14 to draw the associated axles into the assemblies and as explained above provide a compensating torque which, in this instance, counteracts the oversteer characteristics of the front wheel drive.

In designing a front wheel drive compensating device of the type described above, it should be apparent that the axial force F produced in the half axles is proportional to the driving torque transmitted to the axles and is also subject to the design parameters of the "pot" assemblies. In addition, the distance between the wheel steering axis and the center of the associated universal joint will determine the size of the moment arm and therefore effect the magnitude of the compensating torque. Hence, it will be understood by those skilled in this art that all of these factors must be taken into account when designing the invention; the important consideration being that the parts be so located and constructed so that the adverse understeer and oversteer characteristics of the drive wheels when turned are counteracted and canceled by the compensating torques provided by this invention.

Various changes and modifications can be made in the above-described drive arrangement without departing from the spirit of the invention. Such changes and modifications are contemplated by the inventor and therefore it should be understood that he does not wish to be limited except by the scope of the appended claims.

I claim:
1. A front wheel drive arrangement for a motor vehicle having a frame, comprising a wheel supported by said frame for steering movement about a substantially vertical axis, a drive mechanism connected to said frame, a half axle for driving said wheel, a universal joint mechanism including a helical spline coupling means connecting the inboard end of said axle with said drive mechanism, and a universal joint connecting the outboard end of said axle with said wheel at a point offset from said axis so that when said wheel is turned and driving torque is applied thereto a force automatically acts against the wheel to effectively decrease the turning radius.

2. In a motor vehicle comprising a frame, a drive mechanism supported by said frame, a wheel, a suspension assembly connecting said wheel to said frame and supporting said wheel for steering movement about a substantially vertical axis, a half axle for driving said wheel, a first universal joint connecting one end of said half axle to said drive mechanism, a second universal joint located adjacent said axis for connecting the other end of said axle to said wheel, said first universal joint including a splined coupling, the splines of said coupling being arranged in the form of a helix so that accelerating and braking torque impart a force in said axle along its longitudinal axis for respectively decreasing and increasing the effective turning radius of the wheel when the latter is in a turned position.

3. A front wheel drive arrangement for a motor vehicle having a frame, comprising a drive mechanism supported by said frame, independent suspension assemblies supporting a pair of wheels on opposite sides of said frame for steering movement about substantially vertical axes, oppositely extending swingable live axles, first universal joint mechanisms connecting the inboard ends of said axles to said drive mechanism, each of said first universal joint mechanisms having a helical spline connection with the direction of the helix being such that acceleration torque imparts axial thrust in said axle away from the drive mechanism while braking torque imparts axial thrust in said axle towards the drive mechanism, second universal joints connecting the outboard ends of said axles with said wheels, the center of each of said second universal joints being located inboard from the steering axis of the associated wheel so that upon turning said wheels about the steer axes said second universal joints are moved in opposite directions with respect to a transverse line passing through said steer axes.

References Cited by the Examiner

UNITED STATES PATENTS

| | | | |
|---|---|---|---|
| 1,182,928 | 5/1916 | Osborn | 180—48 |
| 1,676,322 | 7/1928 | Chilton | 180—48 |
| 2,015,688 | 10/1935 | Ney. | |
| 2,160,271 | 5/1939 | Kliesrath. | |
| 2,212,193 | 8/1940 | Keese | 180—43 |
| 2,898,750 | 8/1959 | De Lorean | 64—8 |

FOREIGN PATENTS 699,086  12/1930  France.

A. HARRY LEVY, *Primary Examiner.*